Nov. 17, 1925.  1,562,405
A. WOLFF
RAKING MACHINE
Original Filed Nov. 7, 1919
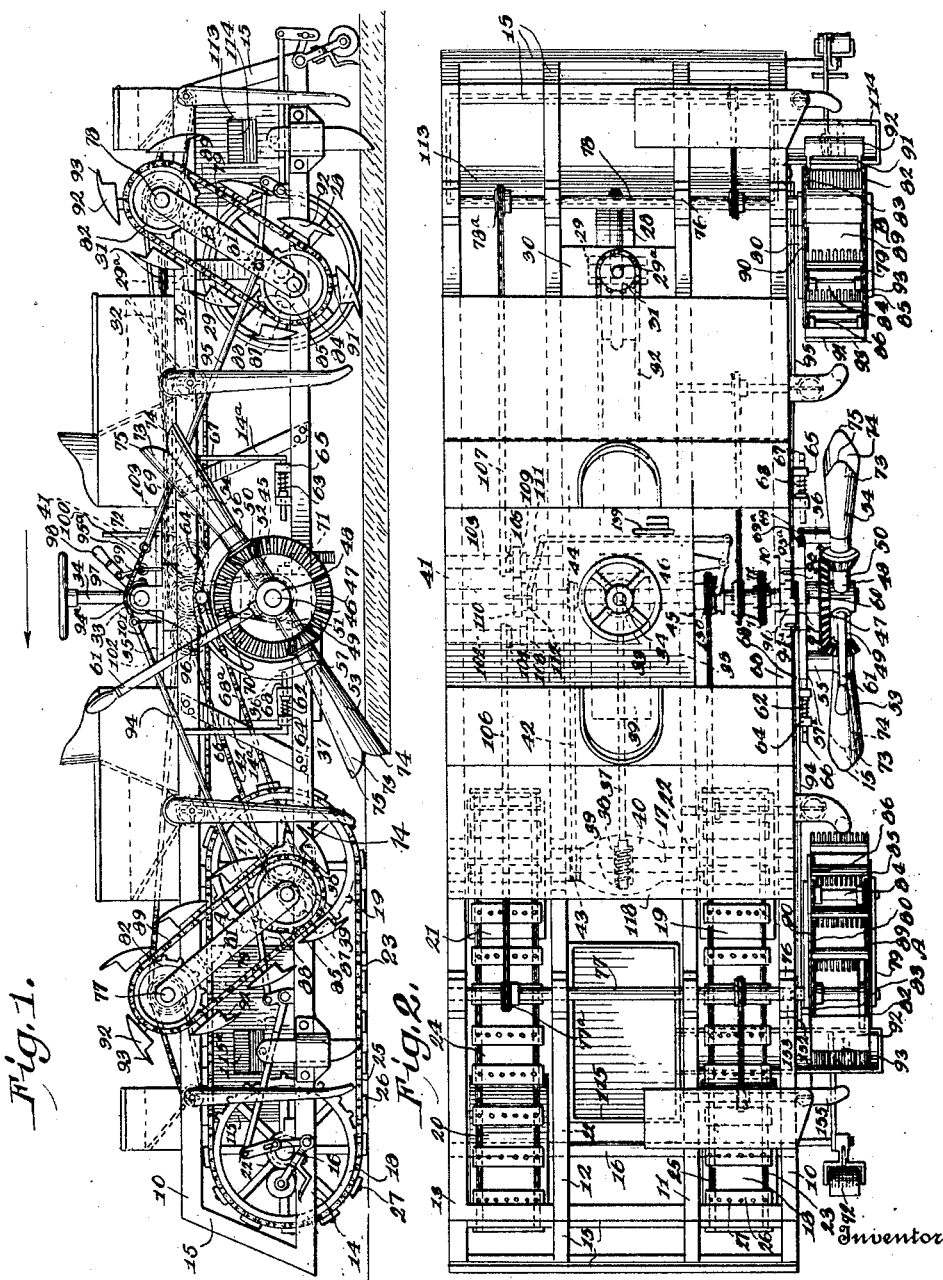
Inventor
August Wolff,
By C. P. Goepel
Attorney Patented Nov. 17, 1925.

1,562,405

UNITED STATES PATENT OFFICE.

AUGUST WOLFF, OF NEW YORK, N. Y.

RAKING MACHINE.

Original application filed November 7, 1919, Serial No. 336,254. Divided and this application filed October 22, 1921. Serial No. 509,468.

*To all whom it may concern:*

Be it known that I, AUGUST WOLFF, a citizen of the United States, and a resident of the borough of the Bronx, county of the Bronx, city and State of New York, have invented certain new and useful Improvements in Raking Machines, of which the following is a specification.

This invention relates to improvements in agricultural machines, and more particularly to raking devices for use on such machines.

The present application is a division of the application filed November 7, 1919, and serially numbered 336,254, which has developed into the U. S. Patent No. 1,402,822, granted January 10, 1922.

An object of the invention is to provide a machine adapted to carry out at one time, or as separate operations if desired, the ground working processes of plowing, and raking, to the end that the farmer will not require more than the one machine for these two operations, and the preparation of the ground for producing vegetation will be greatly simplified, and may be carried out with the least consumption of time and labor.

The further objects are to provide a machine which may be operated in either direction to perform similar operations, so that it may be run back and forth over the ground without necessitating turning.

With these and other objects in view, an embodiment of my invention is shown in the accompanying drawing, and this embodiment will be hereinafter more fully described with reference thereto, and the invention will be finally pointed out in the claims.

In the accompanying drawings, Fig. 1 is a side elevation of the present embodiment of my improved agricultural machine. Fig. 2 is a plan view thereof. Similar reference characters indicate corresponding parts throughout the several figures of the drawings.

Referring to the drawings, the embodiment of my invention shown therein, comprises a frame preferably of structural steel, and consisting of parallel longitudinal upper beams 10 and 11, 12 and 13, lower longitudinal beams 14, bracing beams 14ª, disposed between the upper beams 10 and 13 and the lower beams 14, and horizontal and upright beams 15 at the ends.

The shafts 16 and 17 of toothed wheels 18, 19, 20, and 21, are journalled transversely of the beams 14 at one end of the frame in bearings 22, endless traction belts 23 and 24 extending over the respective wheels 18, 19 and 20, 21. The traction belts comprise spaced pairs of parallel chains 25, extending over the toothed peripheries of the wheels, and connected by ground-engaging cross pieces 26, provided with suitable traction studs 27. At the other end of the frame there is provided a single guide wheel 28, journalled in a forked bracket 29, the upright shaft 29ª of which is rotatably mounted in a cross piece 30 of the frame, and is provided with a sprocket gear 31, connected by the sprocket chain 32 to a sprocket gear 33, provided on a steering post 34 mounted upon a central platform or floor 35, supported upon the frame.

The shaft 17 is driven from the motor 36. The shaft 37 of the motor is provided with a worm 38, engaging a worm gear 39 provided on the shaft 17 within the differential housing 40. The motor is mounted substantially centrally of the machine, and is of any desirable type, being provided with the usual control and reversing means (not shown).

A transverse drive shaft 41 is journalled in the beams 10, 11, 12, and 13, beneath the floor 35, and is driven from the shaft 17 by means of chain 42, extending over sprocket gears 43 and 44, provided respectively on the shafts 17 and 41. Beneath the shaft 41 there is journalled in bearings 45 upon the beams 14, a shaft 46, having one end projecting from the frame, and provided with a bevelled gear 47 keyed thereon, the shaft also having loosely mounted thereto a hub 48, provided with a pair of radially disposed tubular bearing portions 49 and 50, in which are mounted the shafts 51 and 52 of the plow blades 53 and 54, said shafts engaging the apertured ends of forwardly projecting arms 55 and 56, provided on an arcuate slotted plate 57, disposed circumferentially about the bevelled gear 47. The slot of the plate 57 engages a fixed pin 60, and a handle 61 extends upwardly from the hub 48 and by swinging this from one extreme position to the other, either of the plows may be engaged in the ground, depending upon the direction in which the machine is to travel. In either of the extreme positions, the positions of the plows are fixed by spring pressed bolts 62 and 63, slidably mounted in brackets 64 and 65, secured to the beam 14, and provided with upwardly extending handles 66 and 67 by means of which they may be retracted, the said bolts engaging sockets 68 and 69 in the periphery of the plate 57. Additional sockets 68ª and 69ª are provided in the plate 57 to enable the positioning of the plows at different degrees of elevation and inclination. The shaft 46 is driven from the shaft 41 by means of a chain 70 extending over sprocket gears 71 and 72 respectively provided on the said shafts, and thereby through the bevelled gear and pinions, the plows are rotated. By moving the handle 61 to an intermediate position, both plows will be raised from the ground, the bolts 62 and 63 entering beneath the ends of the plate 57 and supporting the plows in a raised position.

The plows comprise two curved and flared blades 73 and 74 pointed at their ends as at 75, and arranged with their concave sides toward each other to form a tube. In operation the pointed ends cut into the ground with a scooping, drilling action, which effectually turns and breaks up the ground.

At each side of the plows and toward the ends of the frame, there are journalled in bearings 76 mounted upon the beams 10, 11, 12 and 13, transverse shafts 77 and 78, projecting beyond the frame at the plow side thereof, and supporting the raking apparatus A and B respectively. These raking apparatus are similar in form, but opposed in relation, and are adapted to operate behind the plows, one being in operation, while the other is out of operation. They each comprise an inclined frame having a pair of parallel sides 79 and 80, connected by intermediate bracing pieces 81, the upwardly extending apertured ends engaging the respective shafts 77 and 78, sprocket gears 82 and 83 being secured to the said shafts within the frame, while the downwardly projecting apertured ends support a shaft 84, having sprocket gears 85 and 86 mounted thereon, and engaging at its inwardly projecting end the arcuate slot 87 of a plate 88 secured to the beam 14. Endless chains 89 and 90 extend over the sprocket gears and support a series of cross-bars 91 upon which are mounted conveyer buckets 92, provided at their open ends with projecting rake teeth 93, and adapted as they engage the ground to gather up rocks, brush, and the like, extending above the ground. The frames of the raking apparatus are connected by rods 94 and 95, provided at their ends with flexible portions 94ª and 95ª, to the periphery of a drum 96, mounted in a bracket 97 supported on the beam 10, the said drum being provided with a lever handle 98 by which it may be turned and through its connections with the raking apparatus, raise either of them, while the other is lowered, so that the apparatus to be operated is engaged with the ground, while the other is raised therefrom. The handle 98 is secured in position by means of a hook 99, engaging one of the other of two eyelets 100 and 101 provided on the base of the bracket 97. By moving the handle to an intermediate position, both of the raking apparatus will be raised from the ground.

The shafts 77 and 78 are individually driven from the drive shaft 41 by countershafts 102 and 103 journalled in the beams 12 and 13, and provided with sprocket gears 104 and 105 connected by chains 106 and 107 to sprocket gears 77ª and 78ª on the shafts 77 and 78. Gears 108 and 109 on the countershafts 102 and 103 are adapted to be individually meshed with a shifting gear 110, keyed to the shaft 41 and adapted to be shifted by means of a lever 111 pivotally mounted upon the under side of the floor 35 and engaging the annular groove 112 in the hub of the gear 110. As illustrated, the machine is arranged to move in the direction of the arrow, the raking apparatus B is lowered and driven, while the raking apparatus A is raised and stationary. The material picked up by the raking apparatus B is deposited in a receptacle 113 transversely supported upon the beams 14, the material first falling upon an inclined chute 114, which carries it to the receptacle; and similarly, the material picked up by the raking apparatus A is deposited in a receptacle 115, disposed longitudinally, however, between the beams 11 and 12, an inclined chute 115ª, carrying the material to the receptacle.

In the illustration, the machine moving in the direction of the arrow, the plow 53 and the raking apparatus B, are in operation, performing the successive functions of plowing and raking rocks, brush, and other débris projecting above the ground. When the machine reaches the end of its travel in one direction, the same is shifted so that the plow will engage the unbroken ground contiguous to the previously broken ground, and the plow 54 is placed in operative position together with the raking apparatus B, whereupon by driving the machine in the reverse direction, these parts of the machine function in a similar manner to the corresponding parts above referred to. In either direction of movement of the machine, the driver may observe the action of the plow through the frame at the one side of the platform 35, so that he may accurately determine the direction to drive the machine. By disconnecting the driving chains of any of the various implements, namely, in plow or raking apparatus, one or more of the implements may be made operative or inoperative, so that the machine may be operated as a plow only, or as a raking apparatus, or in combination, depending upon the particular requirements. The machine, it will be understood, may be used for excavating, trench-digging and the like.

I have illustrated and described a preferred and satisfactory embodiment of my invention, but it is obvious that changes may be made therein within the spirit and scope thereof, as defined in the appended claims.

What is claimed is:

1. In an agricultural machine, a frame, propulsion means therefor, a plow on said frame adapted to be adjusted into fixed relation to the frame and extend in the direction of progressive movement thereof, and raking means carried by said frame at both sides of said plow, said raking means being adjustable toward and from the ground whereby to throw the one or the other raking means into operation cooperating with the position of the plow and adapted to operate upon the soil in rear of the plow, and conveying means associated and operating with said raking means for removing foreign matter from the soil sifted out by said raking means.

2. In an agricultural machine, a frame, propulsion means therefor adapted to propel the vehicle in either forward or reverse directions, a plurality of plow means on the frame adapted to be adjusted in opposite directions into contact with the ground in accordance with the direction of progressive movement of the machine, a pair of raking devices mounted on the frame at opposite sides of said plow means and supported on the frame for adjustable movement into and out of operative relation with the ground, intermediate means on the frame for alternately raising and lowering said raking means in conformity with the disposition of said pair of plow means whereby the raking means in rear of the operative plow is adjusted into operative relation with the soil, and conveying means associated with said raking means and operating in conjunction therewith to remove foreign material turned up by said raking means.

3. In an agricultural machine, a frame, plow means centrally of the frame adapted to be swung down in opposite directions in accordance with the direction of movement of the frame, an endless conveyor at each end of said frame, said conveyor having buckets thereon with projecting lower portion providing rake teeth, and means to alternately raise and lower said conveyors in accordance with the position of said plow and the direction of movement of the vehicle.

In testimony that I claim the foregoing as my invention, I have signed my name.

AUGUST WOLFF.